United States Patent [19]

Okazaki et al.

[11] Patent Number: 5,072,735

[45] Date of Patent: Dec. 17, 1991

[54] ULTRASONIC IMAGING APPARATUS

[75] Inventors: Takahisa Okazaki, Matsudo; Shinichi Okumoto; Hirotaka Nakajima, both of Nishinasundmachi, all of Japan

[73] Assignee: Kabushiki Kaisha Toshiba, Kawasaki, Japan

[21] Appl. No.: 367,835

[22] Filed: Jun. 19, 1989

[30] Foreign Application Priority Data

| Jun. 21, 1988 | [JP] | Japan | 63-152832 |
| Jun. 21, 1988 | [JP] | Japan | 63-152833 |
| Jun. 21, 1988 | [JP] | Japan | 63-152834 |
| Jun. 21, 1988 | [JP] | Japan | 63-152835 |

[51] Int. Cl.$^5$ .............................. A61B 8/00
[52] U.S. Cl. ................. 128/660.07; 73/620; 73/625
[58] Field of Search ............. 128/660.1, 660.07, 620; 73/620, 625–626

[56] References Cited

U.S. PATENT DOCUMENTS

| 4,528,854 | 7/1985 | Shimazaki | 128/661.01 X |
| 4,534,221 | 8/1985 | Fife et al. | 128/661.01 X |
| 4,773,425 | 9/1988 | Saitou | 128/660.04 |
| 4,873,985 | 10/1989 | Nakajima | 128/661.09 |
| 4,915,115 | 4/1990 | Okazaki et al. | 128/660.05 |
| 4,962,667 | 10/1990 | Ogawa et al. | 128/661.01 X |

*Primary Examiner*—Francis Jaworski
*Attorney, Agent, or Firm*—Finnegan, Henderson, Farabow, Garrett and Dunner

[57] ABSTRACT

An ultrasonic imaging apparatus comprises an ultrasonic transducer for propagating ultrasonic beams to a subject, and converting echo beams reflected from the subject into an echo signal, a focus switch circuit for setting a plurality of focal depths, and a focus control circuit for outputting delay signals corresponding to the focal depths set by the focus switch circuit. The focus control circuit changes the delay signals corresponding to the preset focus depths to signals corresponding to the focus depths that are located within a display range, especially when the ultrasonic image is enlarged and shifted with at least one of the preset focus depths out of the display range.

14 Claims, 14 Drawing Sheets

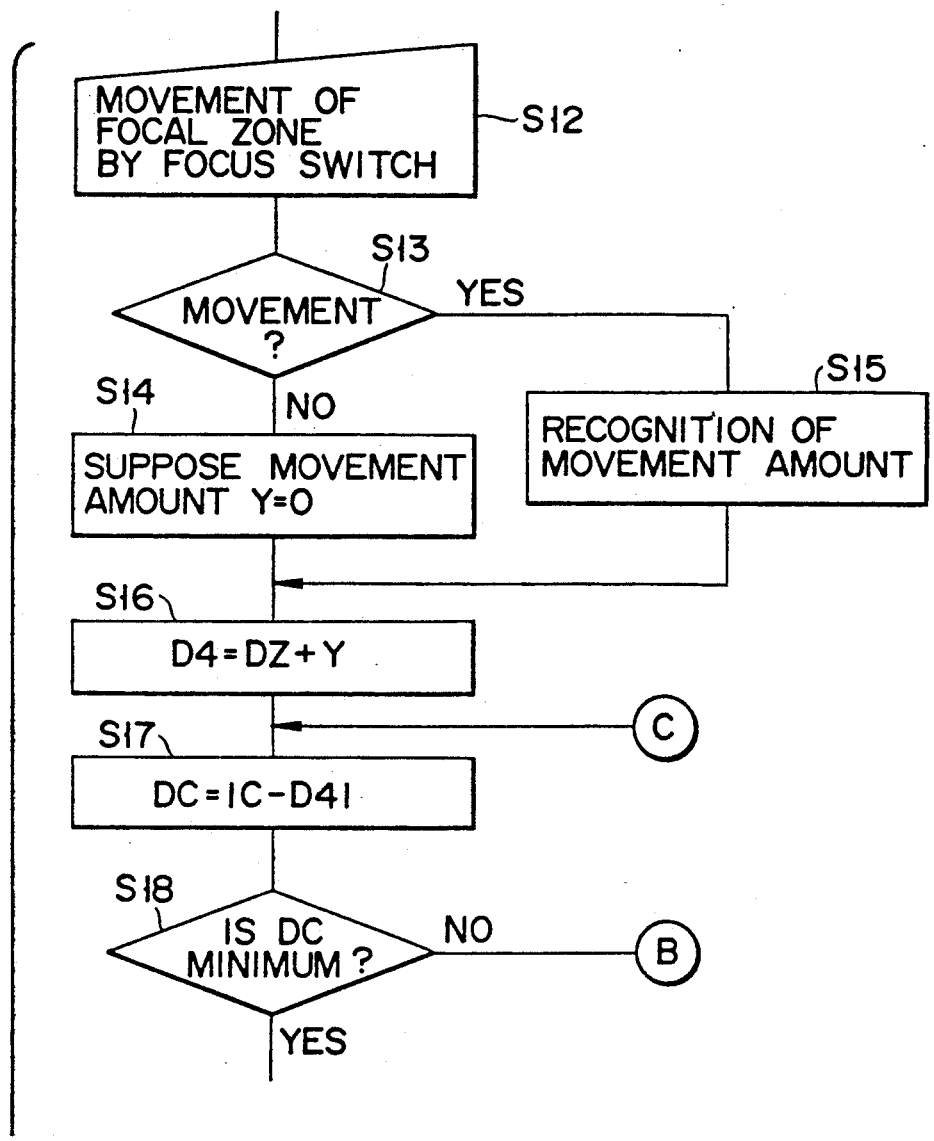
F I G. 8B

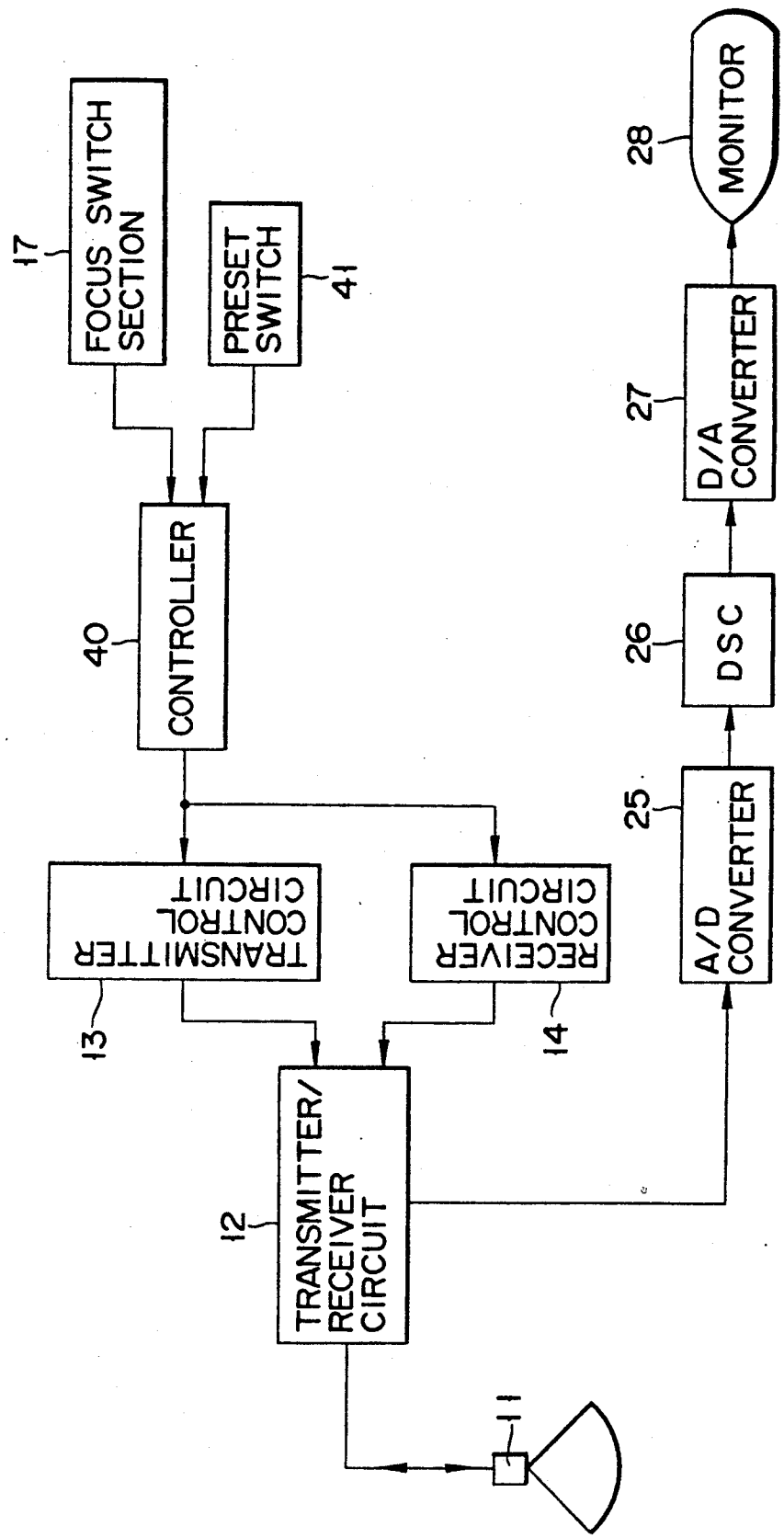
F I G. 10

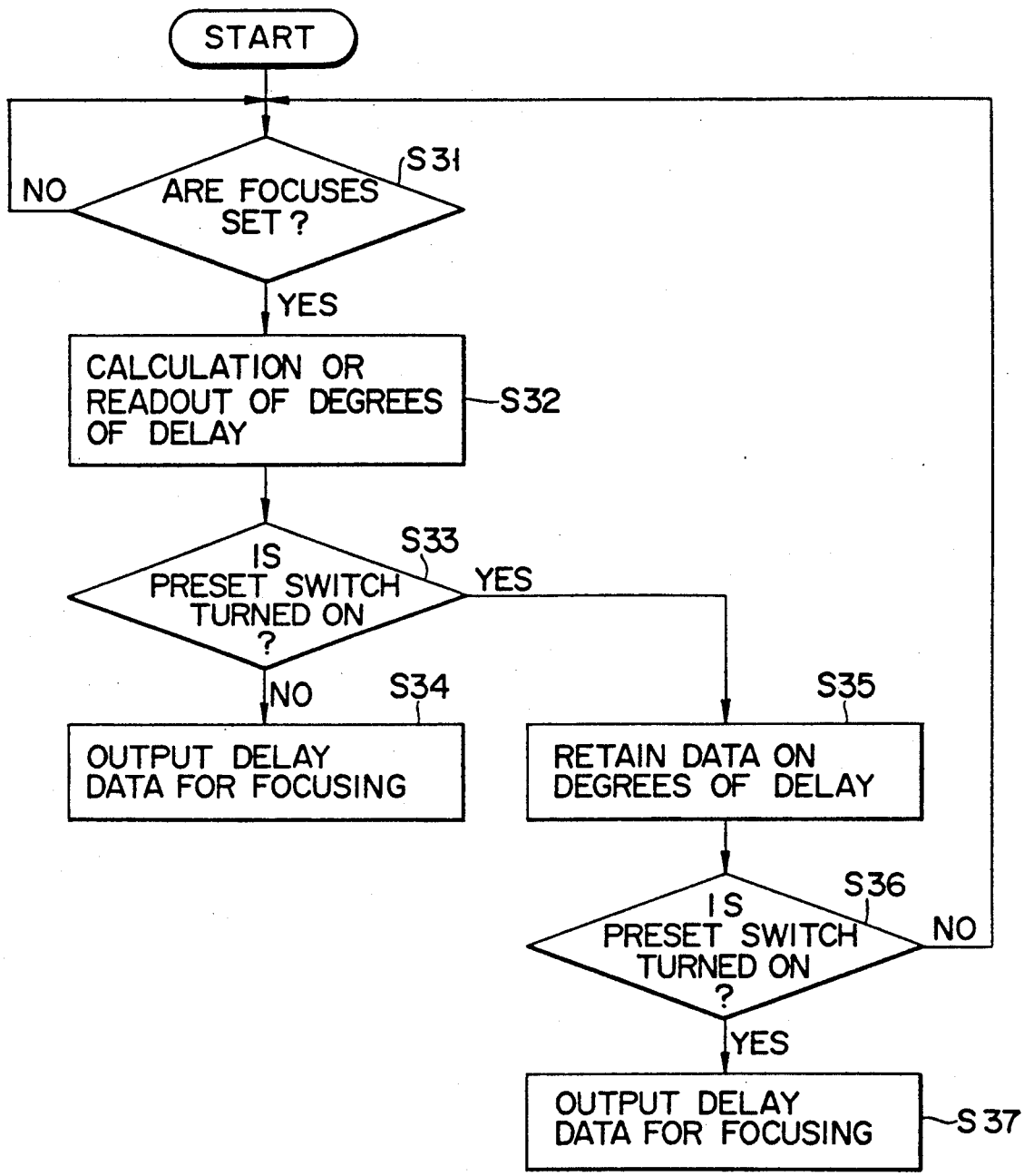
F I G. 12

ULTRASONIC IMAGING APPARATUS

BACKGROUND OF THE INVENTION

1. Field of the Invention

The present invention relates to an ultrasonic imaging apparatus for obtaining diagnostic information, for example, of a B-mode image, by using an ultrasonic wave, and in particular to an ultrasonic imaging apparatus wherein a multi-focus function has been improved.

2. Description of the Related Art

Ultrasonic diagnostic apparatuses include an electronic scan type ultrasonic diagnostic apparatus having an ultrasonic probe (i.e. array probe) in which a number of ultrasonic transducer elements are arranged in parallel. An ultrasonic beam is generated from the ultrasonic probe. The generated beam is electronically focused in a subject, thereby to scan the subject. Based on the ultrasonic echo reflected from the subject, a B-mode image or a two-dimensional blood flow image is produced and displayed on a monitor.

In the case where the above electronic scan type ultrasonic diagnostic apparatus employs a linear electronic scan system, a predetermined number of ultrasonic transducer elements are, as one unit, excited to propagate ultrasonic waves. These excited transducer elements are shifted with a pitch corresponding to one transducer element, whereby the ultrasonic beams generated from the transducer are electronically displaced in the horizontal direction to scan the subject.

In order to converge ultrasonic beams, the ultrasonic transducer elements located near the center of the unit and the ultrasonic transducer elements located on both sides of the unit are excited with a time lag. Thus, ultrasonic beams are propagated to the subject. The wave (echo) reflected from the subject is received by the same transducer element from which the wave is propagated, and is converted into an electric signal, or an echo signal. In this case, the echo signals corresponding to the echo waves received by the transducer elements are subjected to delay processing so that the echo waves are converged. Then, the echo information is displayed on a monitor as a tomographic image. A similar process is also performed in the case of a convex-type scan system.

In the case of a sector electronic scan system, ultrasonic transducer elements are excited with a time lag so that ultrasonic waves generated from the transducer elements are deflected in a the shape of a sector. Echo signals corresponding to echo waves reflected from a subject are processed substantially in the same manner as is employed in the linear electronic scan system. The echo signals are delayed and synthesized to produce a B-mode image signal.

For example, the sector scanning technique for obtaining the B-mode image may be either a single-focus sector scan or a multi-focus sector scan. In the single-focus sector scan technique, ultrasonic beams output from a sector scan ultrasonic probe are focused on one point in a subject. The focal point can be moved by changing the degree of delay of the drive pulses supplied to the transducer elements.

In the single-focus sector scan technique, the degree of delay is suitably changed with respect to each ultrasonic raster so that the focal point is formed at a preset depth. Thus, ultrasonic waves are propagated and the focal point is formed at the preset depth. In the receiving step, image data can be obtained from the focal point at the preset depth.

In the multi-focus sector scan technique, a plurality of focal points can be produced in a single frame at different depths. In other words, a focal point is set at a depth F1 by using a first delay rate, and a focal point is set at a depth F2 by using a second rate. Thus, in the step, two transmission focal points can be produced at depths F1 and F2 by using the two delay rates. In the corresponding receiving step, ultrasonic echos focused at depths different from focal depths F1 and F2 can be collected to obtain data. In an image including the focal points at depths F1 and F2, ultrasonic data of one raster can be obtained by the two ultrasonic transmission/reception steps. Namely, when n-stage focal points are produced, a raster can be obtained by n-rates of ultrasonic transmission/reception. Thus, one ultrasonic image can be obtained at a rate of (n)×(number of rasters).

As described above, according to the conventional ultrasonic diagnostic apparatus, one or more focal points can be produced at one or more desired depths by multi-focus scanning. Thus, the focused area can be diagnosed with the high-resolution image. In this art, the depths of focal points are fixed and selected by a focus selection switch. Consequently, if a diagnosed part of the body or the scope of visual field changes, the fixed focal points mat' become unsuitable.

Suppose, for example, that focal points are set at depths F1 and F2 in a region 1 of interest (ROI) for the purpose of diagnosis with high resolution. In fact, since the depth of a focal point is fixed by each focus selection switch, the depth of a focal point near the region 1 of interest is selected, or the position of a probe is adjusted so that the region 1 of interest corresponds to a suitable depth.

When a region 2 of interest at a depth different from the depth of the region 1 of interest is to be observed, previously set focus positions F1 and F2 mat not necessarily be optimal. At this time, the focal point is often displaced from the region 2 of interest, and the focal point needs to be reset. In resetting the focal point, for example, in the region 1 of interest, a suitable depth is located between F1 and F2. In the region 2 of interest, a suitable depth may be located between F3 and F4. Thus, in addition to the resetting of the focal point, readjusting of the position of the probe is required, resulting in troublesome operation.

SUMMARY OF THE INVENTION

The object of the present invention is to provide an ultrasonic diagnostic apparatus which is able to set a focal point at a desired location in a subject.

The present invention provides an ultrasonic imaging apparatus comprising an ultrasonic transducer for propagating ultrasonic beams to a subject, and converting echo beams reflected from the subject into an echo signal; a focus setting member for presetting a plurality of focus depths for performing multi-focal points; a delay degree output circuit for outputting delay degrees corresponding to focus depths in given positions in a display range, to which positions the focus depths of a number of stages set by the focus setting member are to be shifted; a transmitter/receiver circuit for driving the ultrasonic transducer in accordance with the delay degrees to scan the subject in a multi-focusing manner, and for processing the echo signal output from the ultrasonic transducer; and a monitor for displaying a B- mode image based on the echo signal supplied from the transmitter/receiver circuit.

The present invention also provides an ultrasonic imaging apparatus having an ultrasonic transducer for propagating ultrasonic beams to a subject and converting an echo reflected from the subject into an electric signal or an echo signal; a driving circuit for driving the ultrasonic transducer for scanning the subject with the ultrasonic beams and obtaining the echo signal corresponding to a B-mode image from the ultrasonic transducer; a focus depth selector for setting a preset value of the focus depth of the ultrasonic beams and for selecting values of focus depths other than the preset value; and a delay circuit, provided in the driving circuit, for producing a driving signal having delay degree data corresponding to the focus depth selected by the selector.

Since the focus depth can be preset and can be changed to a different value than the preset value, the freedom of setting of the focal point increases. Also since the focus position can be automatically set by setting a display position in correspondence with the region of interest, troublesome operation can be prevented.

BRIEF DESCRIPTION OF THE DRAWINGS

FIGS. 8A to 8C are flow charts for explaining the operation of a focus controller of the ultrasonic imaging apparatus shown in FIG. 5;

FIG. 10 is a block diagram showing an ultrasonic imaging apparatus according to still another embodiment of the present invention;

FIG. 12 is a flow chart for explaining the operation of the apparatus shown in FIG. 10.

DETAILED DESCRIPTION OF THE PREFERRED EMBODIMENT

Figure 1:
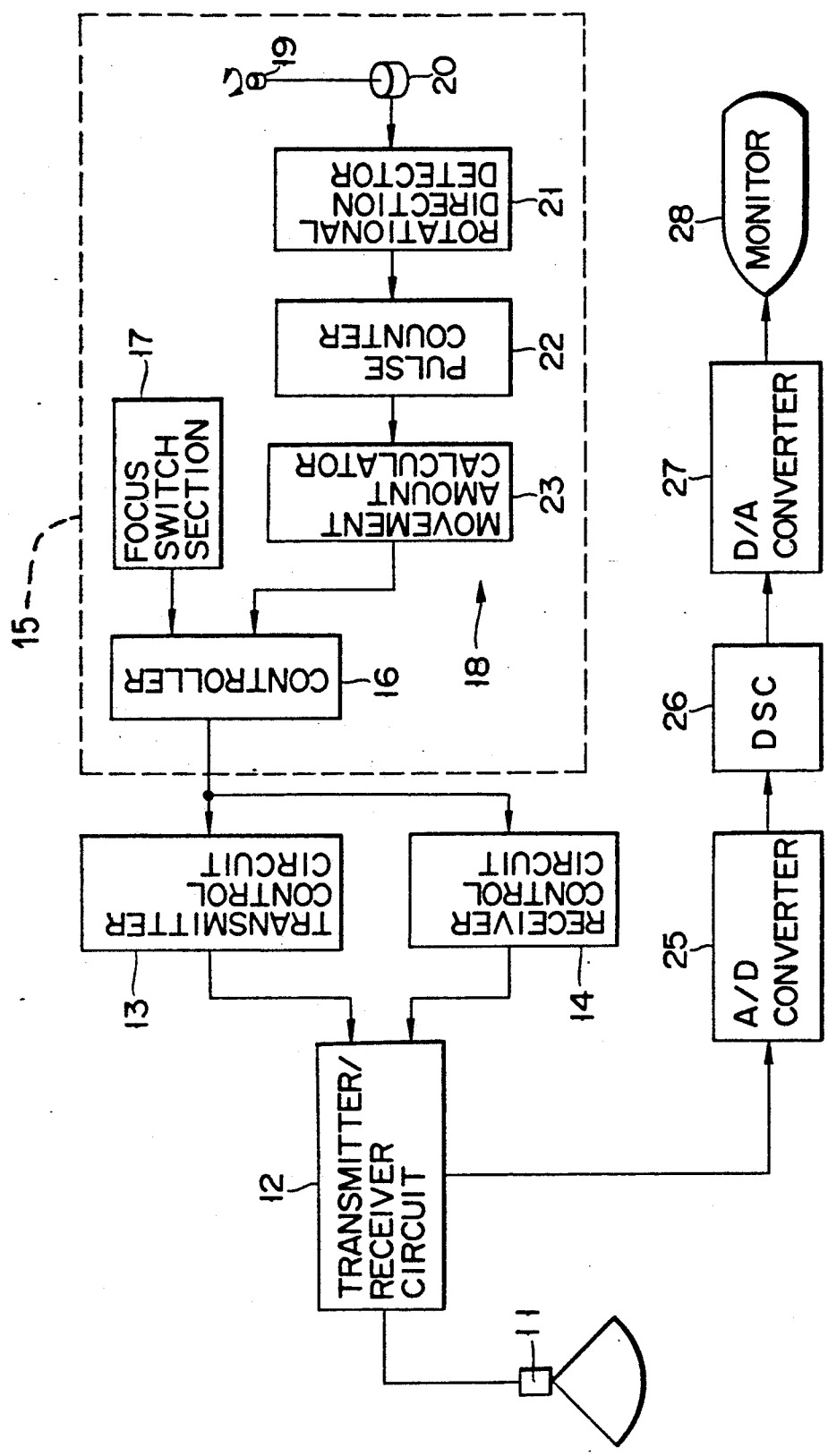
FIG. 1 is a block diagram showing an ultrasonic imaging apparatus according to an embodiment of the present invention.

FIG. 1 shows an ultrasonic imaging apparatus according to an embodiment of the present invention. In FIG. 1, an array probe 11 comprises a plurality of ultrasonic transducer elements arranged in parallel to one another. The array probe 11 is connected to a transmitter/receiver circuit 12 for carrying out a sector scan, a linear scan or a convex scan. The transmitter/receiver circuit 12 is connected to a transmitter control circuit 13 and a receiver control circuit 14. Both circuits 13 and 14 are designed to supply to the transmitter/receiver circuit 12 signals representative of degrees of delay (amount of delay or times of delay) which are set in accordance with the deflection of ultrasonic beams and focus depths of the beams.

The transmitter control circuit 13 and the receiver control circuit 14 are connected to a focusing circuit 15 which comprises a controller 16, a focus switch section 17 and a focus continuous setting circuit 18. The focusing circuit 15 supplies a focus control signal to the transmitter control circuit 13 and the receiver control circuit 14. The focus non-stage setting circuit 18 comprises an encoder 20 connected to a focus adjusting dial 19, a rotational direction detector 21, a pulse counter 22 and a movement amount calculator 23.

An output section of the transmitter/receiver circuit 12 is connected to a DSC (digital scan converter) 26 through an A/D converter 25. An output terminal of the DSC 26 is connected to a monitor 28 through a D/A converter 27.

Figure 2:
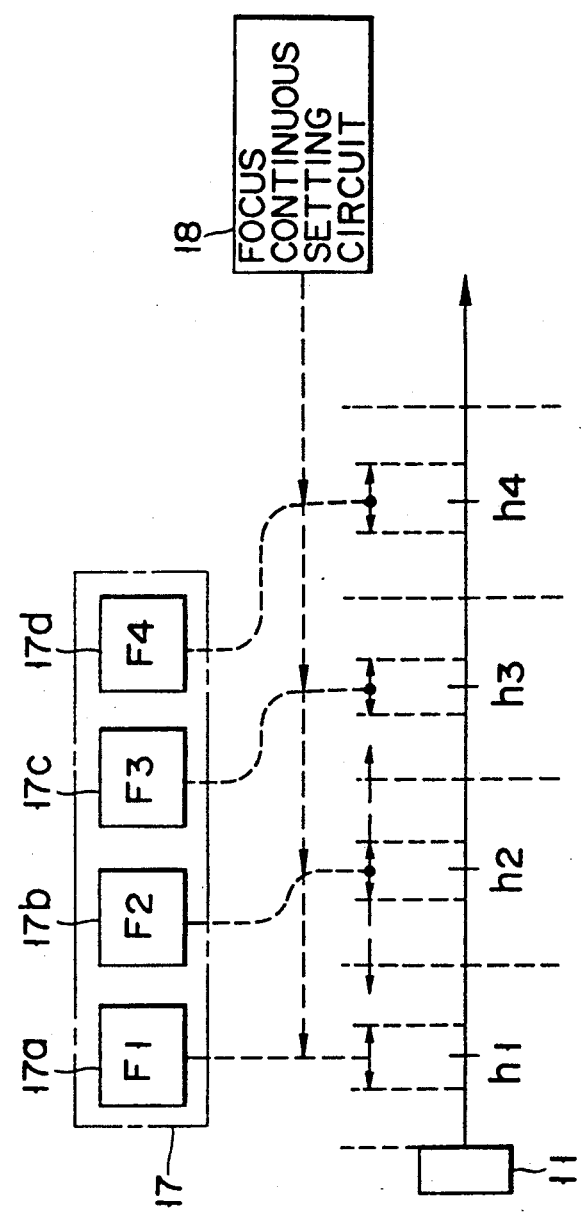
FIG. 2 is a view for explaining a focus presetting process and a non-stage setting.

In the above structure, the focus switch section 17 includes focus selection switches 17a to 17d, as shown in FIG. 2, so that four focus depths F1, F2, F3, and F4 can be set. By the switches 17a to 17d, a single-stage focus, a two-stage focus, a three-stage focus, and a four-stage focus can be selected.

A single-stage focusing process and a multi-stage focusing process in a B-mode sector scan will now be described with reference to FIGS. 3A to 3D and FIGS. 4A to 4D.

Figures 3A, 3B, 3C, 3D, 3E:
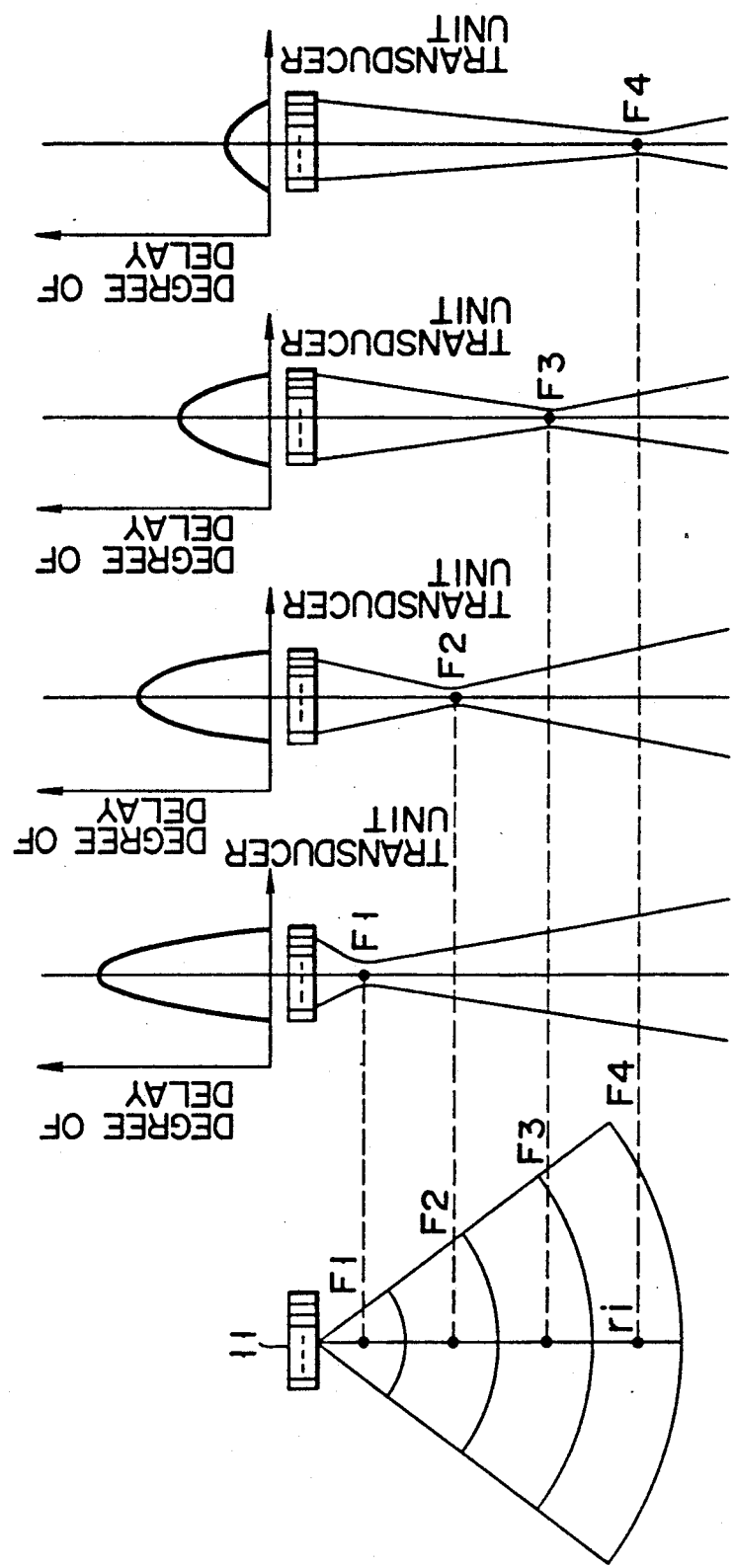
FIGS. 3A to 3E are views for explaining a single-stage focusing process.

FIG. 3A shows the state wherein the sector scan ultrasonic probe 11 transmits/receives ultrasonic beams to/from a subject in a B-mode scanning process. FIGS. 3A to 3D show the states wherein focal points are set in different depths F1, F2, F3, and F4 along a vertical line (raster ri) extending from the probe 11.

FIG. 3A shows varying degrees a degree of delay, based on which the transmission timing for driving the transducer elements of the probe 11 are determined. The degree of delay as shown in FIG. 3B is determined so that the ultrasonic beams are focused at depth F1. In the receiving process, receiving focal points are formed at respective depths, and data is collected.

Similarly, FIG. 3C shows the case where the degree of delay is determined so as to set the focal point at depth F2. FIG. 3D shows the case where the degree of delay is determined so as to set the focal point at depth F3. FIG. 3E shows the case where the degree of delay is determined so as to set the focal point at depth F4.

Figures 4A, 4B, 4C, 4D:
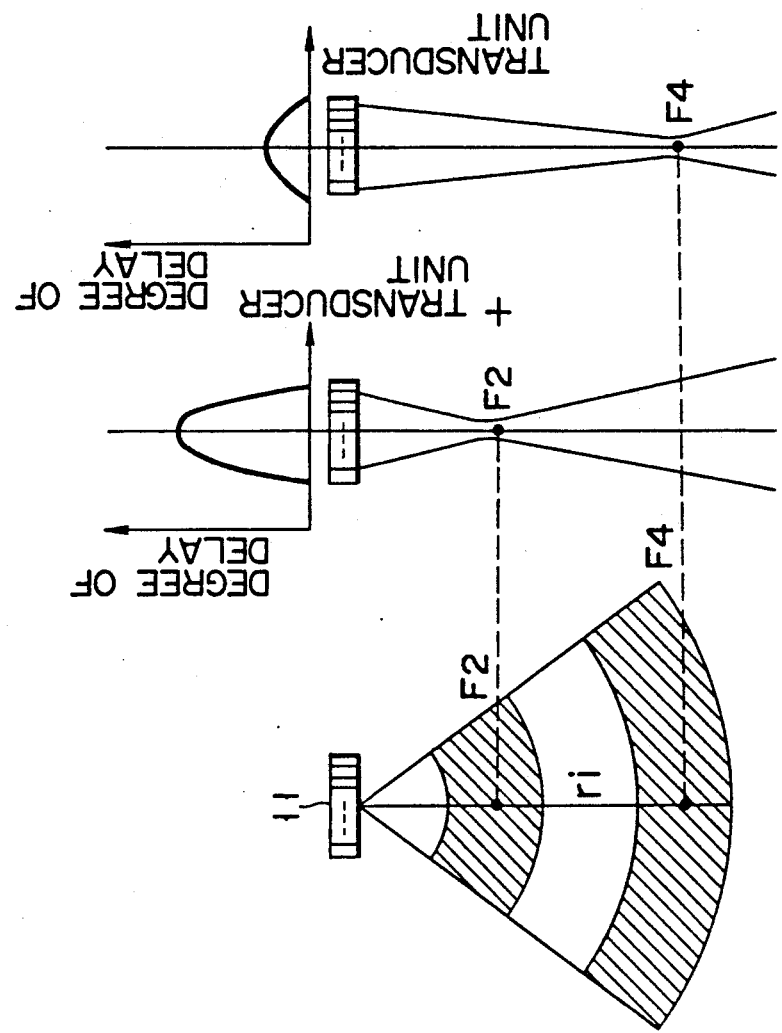
FIGS. 4A to 4D are views for explaining a multi-stage focusing process.

FIG. 4A shows a multi-stage focusing process wherein a subject is scanned in the B-mode by ultrasonic beams output from the sector scan ultrasonic probe 11. In FIG. 4A, focal points are set at different depths F2 and F4 along a vertical line (raster ri) extending from the probe 11.

In the multi-stage focusing process, at a first rate, the degree of delay is determined so that a focal point can be set at depth F2, as shown in FIG. 4B. At a second rate, the degree of delay is determined so that a focal point is set at depth F4, as shown in FIG. 4C. Based on these two degrees of delay, two transmission/reception operations are performed. As a result, as shown in FIG. 4D, focal points are set at depths F2 and F4 in a transmission step. In a receiving step, a receiving focal point is formed at each depth, and data is collected. An ultrasonic raster including the focal points at depths F2 and F4 can be obtained by two ultrasonic transmission/reception steps. In other words, one ultrasonic raster can be obtained by n-number of rates of ultrasonic transmission/reception.

A focus-setting operation will now be described.

When one or more of focus selection switches 17a to 17d in the focus switch section 17 are turned on, the controller 16 calculates and produces delay data corresponding to the focus depth assigned to the turned-on switch(es), or the controller 16 reads out the corresponding delay data from a memory. The transmitter control circuit 13 and receiver control circuit 14 receive and correct the delay data fed from the controller 16. The transmitter control circuit 13 produces, based on the delay data, signals representative of degrees of delay assigned to the ultrasonic transducer elements for carrying out a focused B-mode scan. The receiver control circuit 14 determines degrees of receiving delay, based on which echo signals produced from the probe 11 are processed. The degrees of receiving delay are determined in relation to the degrees of transmission delay.

In the focus continuous setting circuit 18, the encoder 20 converts the degree of rotation of the dial 19 provided near the focus switch section 17 into a corresponding pulse. The rotational direction detector 21 detects the rotational direction of the encoder 20. The pulses counter 22 counts the pulse fed from the encoder 20. The movement amount calculator 23 calculates the focus movement amount from the value obtained by the pulse counter 22.

When the controller 16 receives data representative of a desired focus movement in depth and direction from the focus continuous setting circuit 18 while one of focus selection switches of the focus switch section 17 is turned on, the controller 16 releases the setting of the fixed focus depths and produces delay data for changing the fixed focus depths in accordance with the movement amount data fed from the movement amount calculator 23.

For example, assume focus selection switch 17b of the focus switch section 17 is turned on, as shown in FIG. 2, and the focus depth F2 is set. In this case, when the dial 19 in the focus continuous setting circuit 18 is rotated in one direction or in the other, the focus depth is finely adjusted toward F1 (shallow) or toward F4 (deep), as shown in FIG. 2. When the focus selection switches 17b and 17c are turned on, focus depths F2 and F3 are set. At this time, when the dial 19 is rotated in either direction, the focus depths F2 and F3 are finely adjusted toward F1 or toward F4, while the relationship between F2 and F3 is maintained, as shown in FIG. 2.

As described above, since the focus depth preset in the focus switch section 17 can be adjusted to a desired value, the desired focus depth can be set even if the part of the body to be diagnosed and the visual field change.

In the above embodiment, the encoder is used as member for continuous adjustment of focus depth. However, this member is not limited to the encoder, and any type of variable-adjustment member can be used. Also, the continuous adjustment technique may be employed only in the transmission focusing process.

According to the above embodiment, the continuous adjusting member for continuously adjusting the focus depths, which have been preset in stepwise manner, is provided in addition to the focus selection switches for selecting the preset focus depths. Thus, the focus depths selected by the focus selection switches can be finely adjusted, and, even if the part of the body to be diagnosed and the visual field vary, desired focus depths can be set.

Another embodiment of the present invention will now be described with reference to FIG. 5.

Figure 5:
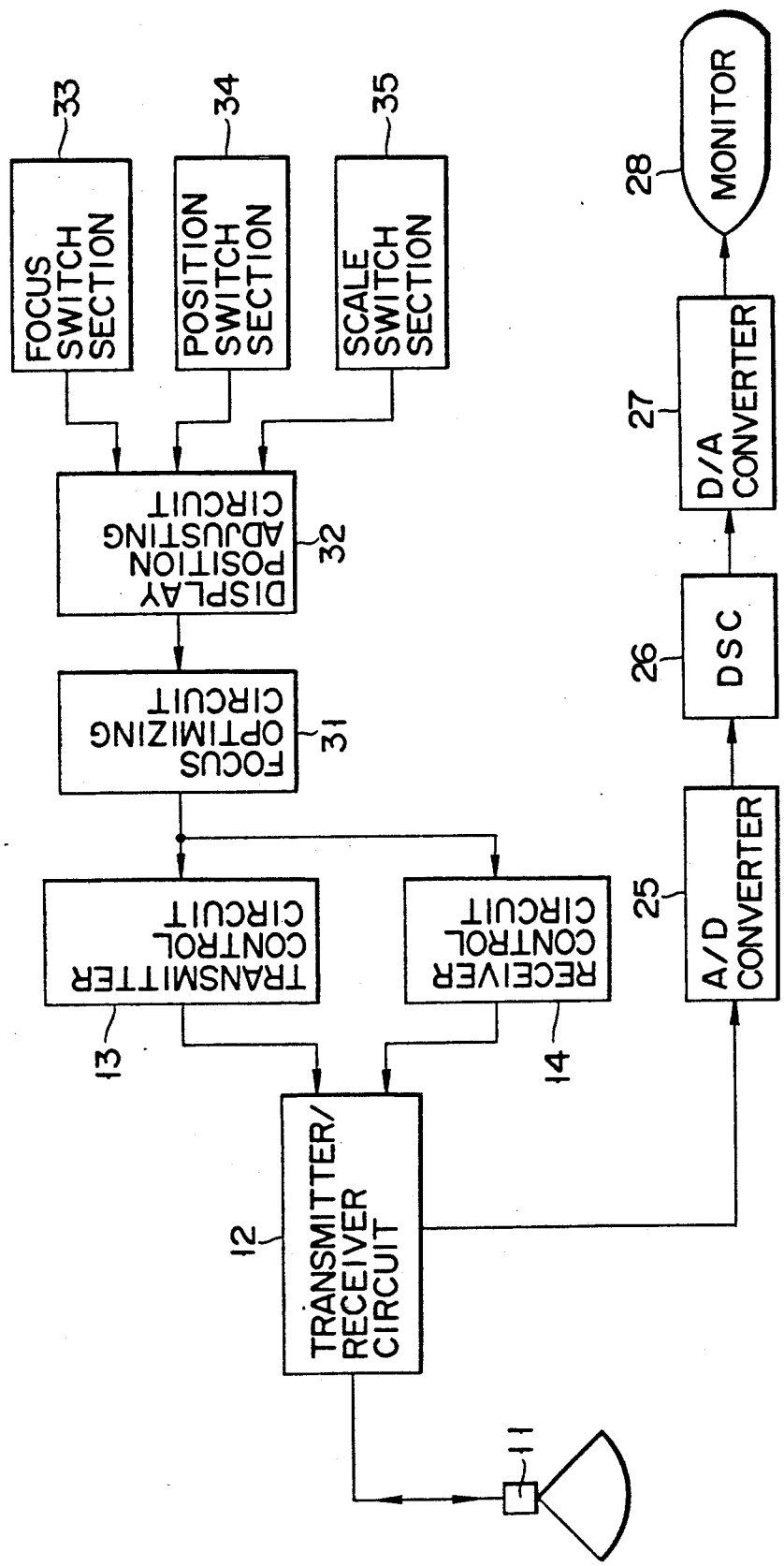
FIG. 5 is a block diagram showing an ultrasonic imaging apparatus according to another embodiment of the invention.

In the embodiment shown in FIG. 5, a focus control section connected to the transmitter control circuit 13 and receiver control section 14 comprises a focus optimizing circuit 31, a display position adjusting circuit 32 connected to an input terminal of the circuit 31, a focus switch section 33 connected to an input terminal of the display position adjusting circuit 32, a position switch section 34, and a scale switch section 35.

Figure 6:
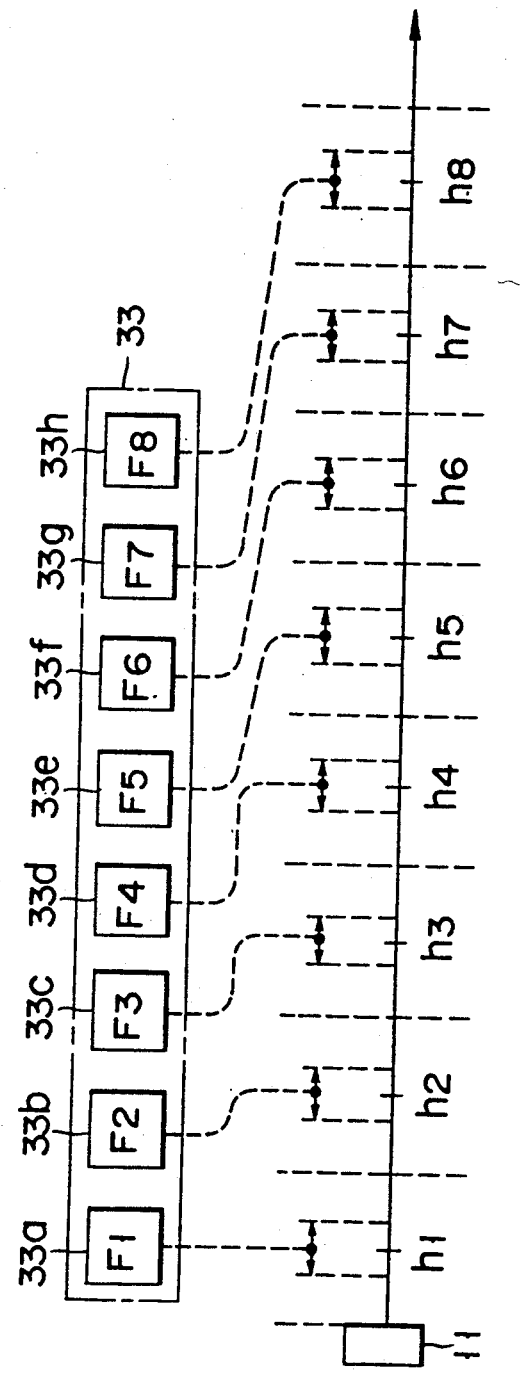
FIG. 6 is a view for explaining a relationship between focus selection switches and the degrees of delay.

The focus switch section 33 comprises eight focus selection switches 33a to 33h for setting focus depths F1 to F8, as shown in FIG. 6. When one of the switches 33a to 33h is turned on, a single-stage focal point at a depth assigned to the turned-on switch is set. By the combination of the focus selection switches 33a to 33h, two- to eight-stage focal points can be set.

The display position adjusting circuit 32 calculates the scope of an image displayed on the monitor 28 on the basis of the scale factor (magnification factor) and the shift amount, and the resulting display position data is supplied to the focus optimizing circuit 31. The focus optimizing circuit 31 changes the focus depths in response to the display position data, so that multi-stage focuses can be located near the center of the screen of the monitor 28.

Figure 7C:
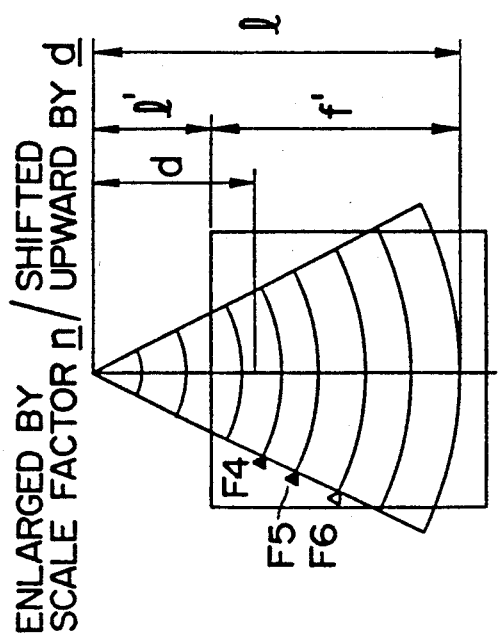
FIGS. 7A to 7C are views illustrating a focus depth changing process.
Figure 7B:
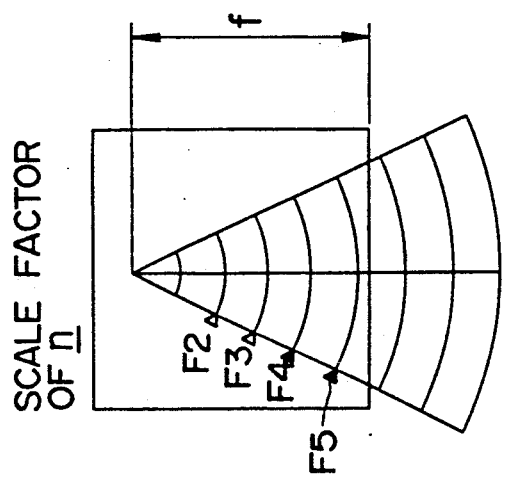
Figure 7A:
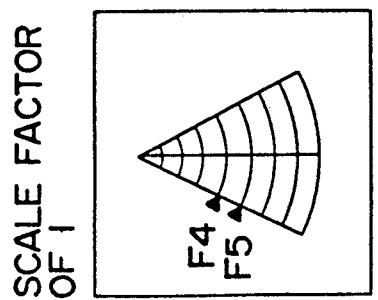

When the focus selection switches 33d and 33e (FIG. 6) are turned on and focus depths F4 and F5 are set, an image as shown in FIG. 7A is displayed on the monitor 28. At this time, if the scale factor is set to n by the scale switch 35, the image is enlarged, as shown in FIG. 7B. With respect to this enlarged image, the display position adjusting circuit 32 calculates a display range upon receiving the display range f, the focus optimizing circuit 31 examines whether the focus depths F4 and F5 are located at the center of the screen. In this embodiment, the focus depths F4 and F5 are located lower than the center of the screen. Thus, the focus optimizing circuit 31 changes focus depths F4 and F5 to focus depths F2 and F3 located at the center of the screen, and supplies the focus data representative of the changed focus depths to the transmitter control circuit 13 and receiver control circuit 14.

The transmitter control circuit 13 calculates the degrees of delay for forming focus points at focus depths F2 and F3 or reads out the corresponding degrees of delay from a memory. The calculated or read-out degrees of delay are supplied to the transmitter/receiver circuit 12. The transmitter/receiver circuit 12 delivers to the transducer elements of the probe 11 drive pulses representative of the degrees of delay corresponding to the focus depths F2 and F3. The probe 11 receives echo signals reflected from the subject, and the echo signals are input to the transmitter/receiver circuit 12. In the transmitter/receiver circuit 12, the echo signals are delayed on the basis of the degrees of delay of the receiving focal points corresponding to the respective depths, which are fed from the receiver control circuit 14. The delayed echo signals are converted into digital signals by the A/D converter 25. The resulting digital signals are converted into TV signals by the DSC 26 and then supplied to the monitor 28 through the D/A converter 27. A clear image obtained at the focus depths F2 and F3 is displayed on the monitor 28.

In FIG. 7C, the image shown is enlarged by the scale factor of n upon the operation of the scale switch section 35 and is shifted upward by a distance d upon the operation of the position switch section 34. When the data representative of the scale factor and the shift amount is supplied to the display position adjusting circuit 32, the display position adjusting circuit 32 calculates the display range f' from parameters d, l and l'. The calculated data on the display range f' is fed to the focus optimizing circuit 31.

Based on the data representative of display range f', the focus optimizing circuit 31 determines whether or not the focus depths F4 and F5 are located at the center of the screen. In FIG. 7C, the focus depths F4 and F5 are located above the center of the screen. Thus, the focus optimizing circuit 31 changes the focus depths F4 and F5 to depths F5 and F6, and delivers focus data representative of the focus depths F5 and F6 to the transmitter control circuit 13 and receiver control circuit 14. Then, the same operation as in the case of FIG. 7B is repeated, so that an image produced at the focus depths F5 and F6 can be displayed on the monitor 28.

Figure 8A:
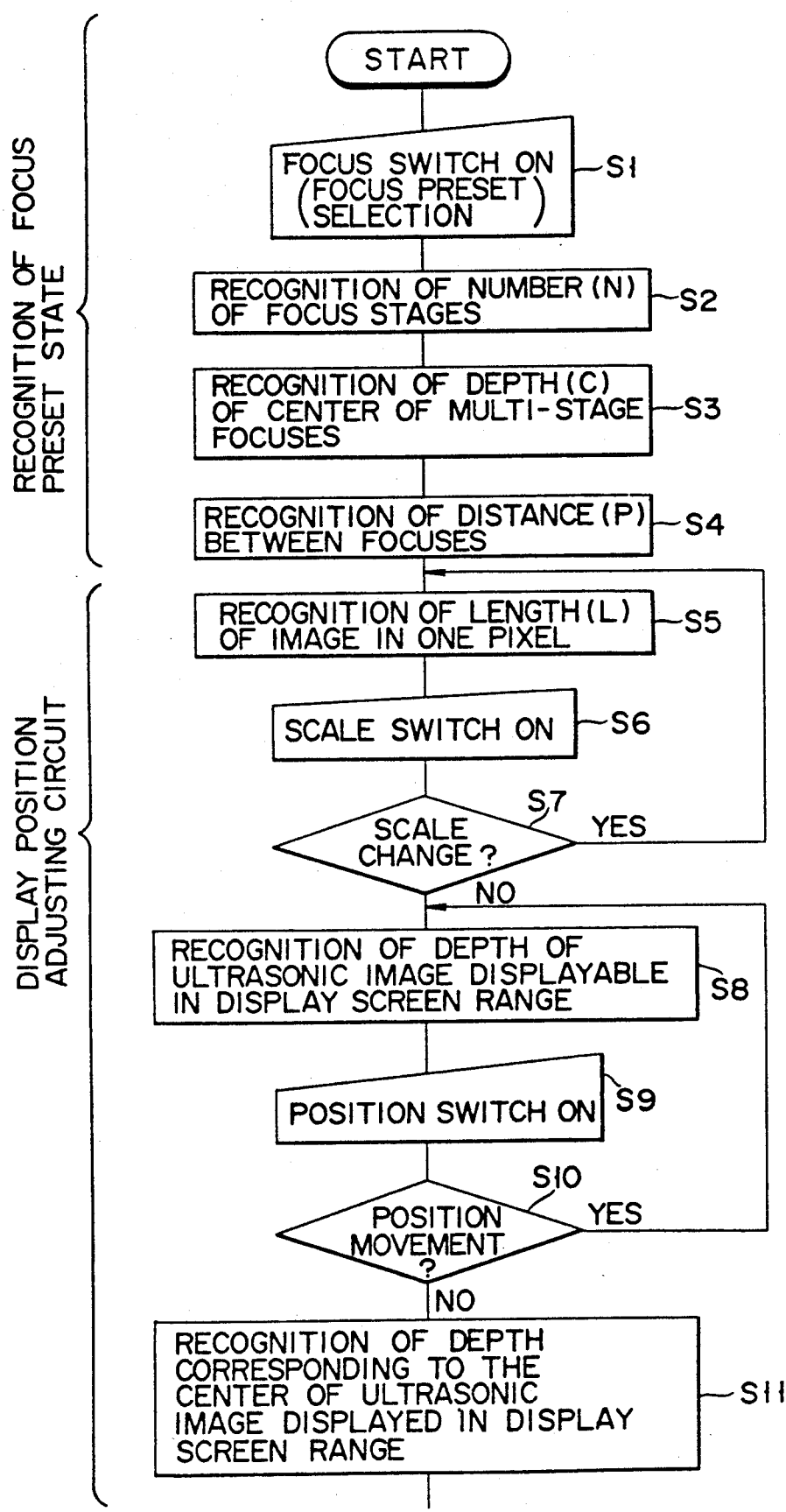
Figure 8C:
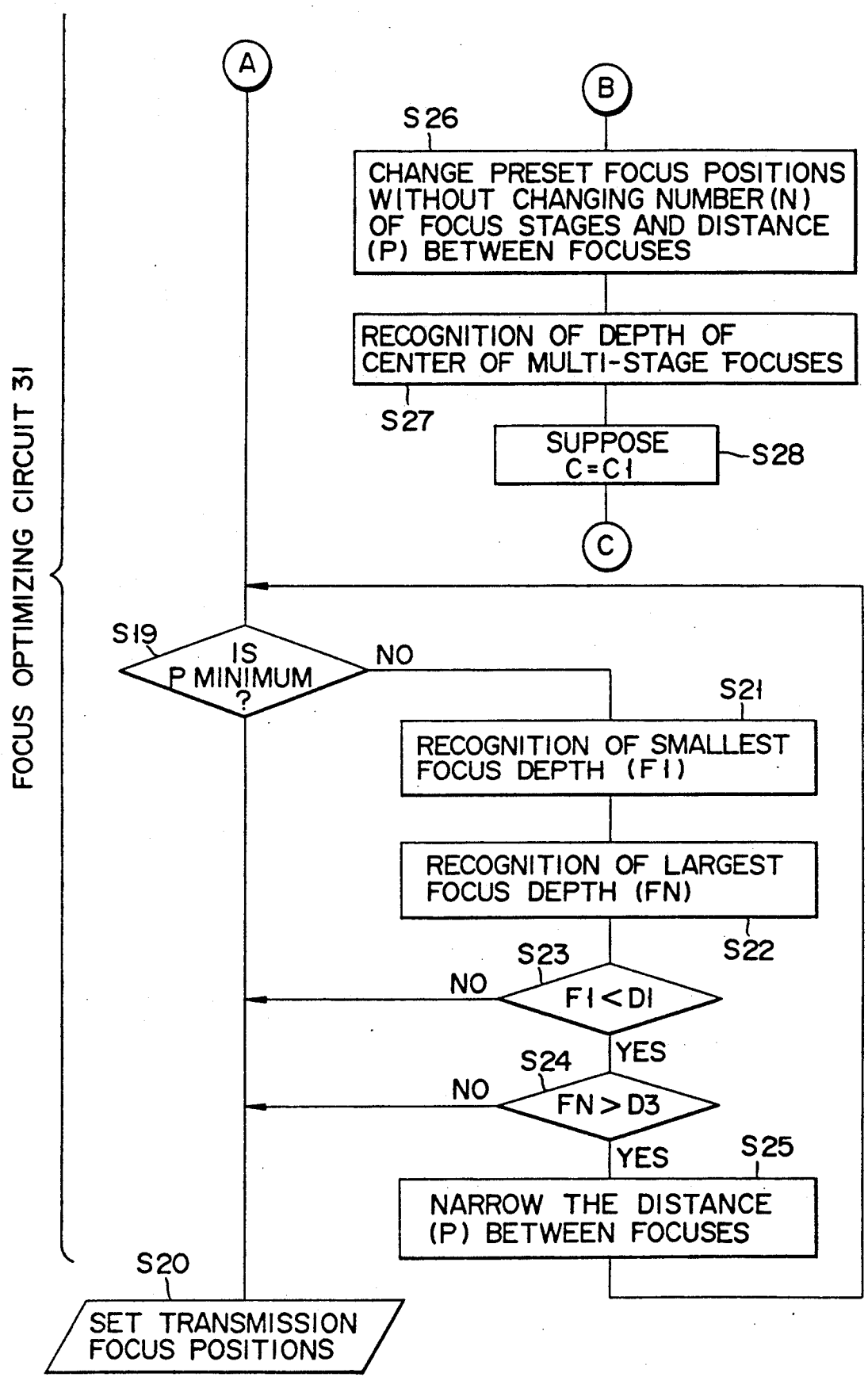

The operation of the focus control section in the embodiment shown in FIG. 5 will now be described with reference to the flow charts of FIGS. 8A to 8C.

At first, the apparatus is turned on, and focus depths are set by the focus switch section 33 (S1). In general, the apparatus is designed such that several ten-stage focus depths can be preset. Actually, several depths, for example, four depths or eight depths are selected depending on the circumstance of use, and the selected depths are assigned to a plurality of focus selection switches 33a to 33h of the focus switch section 33. When the selected focus selection switches are turned on, desired preset focus depths can be set.

Once focal points are set by the operation of focus selection switches 33a to 33h, the number (N) of set focus stages is recognized (S2). Then, the depth (C) of the center of the multi-stage focuses is recognized (S3). For example, if focus depths F2 to F5 are set and F2 is 20 mm and F5 is 100 mm, the center depth is recognized as being 60 mm. Next, a distance (P) between focus parts, i.e., adjacent two focuses, is recognized (S4). The operation of recognition in steps S1 to S4 may be displayed performed by a CPU included in the focus switch section 33.

The result of recognition is supplied to the display position adjusting circuit 32. The display position adjusting circuit 32 recognizes the length (L) in one pixel of a TV screen (S5). In step S6, a scale factor is determined by the scale switch section 35. Once the scale factor data or scale information is input to the display position adjusting circuit 32, the display position adjusting circuit 32 determines whether or not the scale has been changed (S7). If the scale has been changed, the display position adjusting circuit 32 recognizes the length in one pixel of the TV screen once again. If the scale has not been changed, the control routine advances to step S8. In step S8, the display position adjusting circuit 32 recognizes the depth of an ultrasonic image which may be displayed in a display screen range, i.e., the distance between the upper edge (D1) and the lower edge (D3) of the display screen.

In step S9, the displayed image is moved on an as-needed basis, by the operation of the position switch section 34. If the displayed image is moved, the control routine returns to step S8. On the other hand, if the displayed image is not moved, the routine goes to step S11. In step S11, the depth corresponding to the depth (D2) of the center of the ultrasonic image displayed in the display screen range is recognized.

After the display position adjusting circuit 32 has completed the processing in steps S5 to S11 and the recognition result has been supplied to the focus optimizing circuit 31, the focus optimizing circuit 31 executes the following process.

At first, the movement of a focal zone due to the operation of the focus switch section (corresponding to dial 19 having encoder 20 mentioned in the description of the first embodiment) is detected. If the focal zone has not moved, the amount of movement Y=0. When the focal zone has moved, the amount of movement is recognized (S12, S13, S14, and S15).

In step S16, the depth D2 of the screen center is added to the movement amount Y, thus finding the depth D4 of the screen center after the movement. The depth D4 of the screen center is subtracted from the multi-focus center depth C. The resulting absolute value of this subtraction Dc indicates a difference between the center of the initially set multi-focus depth and the center of the screen. The subtraction value Dc is compared with zero (S18). If the value Dc is zero, it is then determined whether or not the distance P between adjacent focuses is a minimum distance value, that it, a minimum distance between the selectable transmission focus depths (S19). If the answer is YES in step 19, the transmission focus position is set (S20). If the answer is NO in step 19, the smallest focus depth of the selectable transmission focus depths (F1) is recognized (S21), and the largest focus depth (FN) is recognized (S22). Then it is determined whether F1<D (S23). If the answer is NO in step 23, the transmission focus position is set. If the answer is YES in step S23, it is determined whether FN>D3. If the answer is NO in step S23, the transmission focus position is set. If the answer is YES in step 23, the distance P between focuses is narrowed (S24).

If the answer is NO in step S18, the preset focus positions are changed without changing the number (N) of focus stages and the distance (P) between focuses (S25). Then, the depth (C1) of center of multi-stage focuses is recognized (S26), and the depth C is changed to C1 (S27). After the depth C is changed, the control routine returns to step S17.

A description will now be given for the case where the distance between multi-stage focuses can be automatically changed.

Figure 9C:
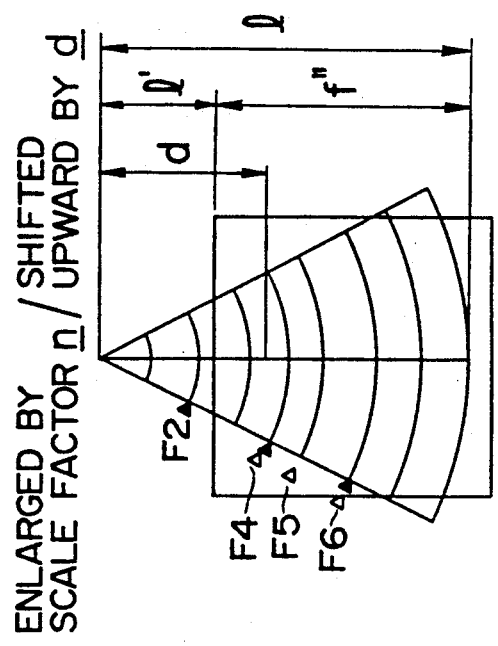
FIGS. 9A to 9C are views for explaining the focus depth change of an ultrasonic imaging apparatus according to still another embodiment of the present invention.
Figure 9B:
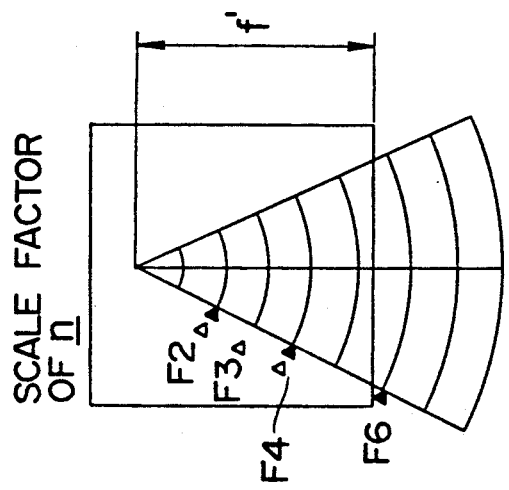
Figure 9A:
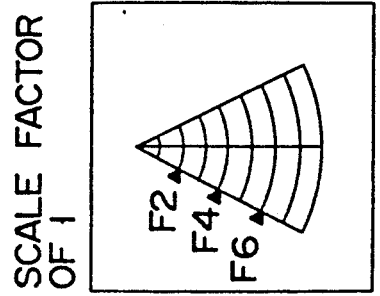

The focus switches 33b, 33d and 33f are turned on, and three focus depths F2, F4, and F6 are set, as shown in FIG. 9A. When the scale factor is set to n by the scale switch 35, the image is enlarged as shown in FIG. 9B. The display position adjusting circuit 32 calculates display range f'. Upon receiving data representative of the display range f', the focus optimizing circuit 31 determines whether or not the focus depths F2, F4, and F6 fall within the display range f'. In FIG. 9B, the focus depth F6 is outside of the display range f'. Thus, the focus optimizing circuit 31 changes the focus depths to the focus depths F2, F3, and F4 located within the display range f', and supplies focus data representative of the changed focus depths F2, F3, and F4 to the transmitter control circuit 13 and receiver control circuit 14.

The transmitter control circuit 13 calculates delay data indicative of the degrees of delay, by which focal points can be formed at the focus depths F2, F3 and F4. Alternatively the transmitter control circuit 13 reads out the corresponding delay data from a memory. The delay data is supplied from the transmitter control circuit 13 to the transmitter/receiver circuit 12. The transmitter/receiver circuit 12 delivers to the ultrasonic transducer elements 11 drive pulses including the delay data corresponding to the focal depths F2, F3, and F4. The transducer elements 11 receive echoes reflected from a subject and transmit the echo signals to the transmitter/receiver circuit 12. The echo signals are subject to delay processing on the basis of the delay data corresponding to the focus depths F2, F3, and F4. The delayed echo signals or receiving signals are converted into digital signals by the A/D converter 25.

The resulting digital signals are converted into TV signals by the DSC 26, and supplied to the monitor 28 through the D/A converter 27. A clear image obtained at the focus depths F2, F3, and F4 can be displayed on the monitor 28.

FIG. 9C shows the image which is enlarged by a scale factor of n by the operation of the scale switch 35 and is shifted upward by a distance d by the operation of the position switch 34. Upon receiving the data representative of the scale factor and shift amount for producing this image, the display position adjusting circuit 32 calculates a display range f' from parameters d, l, and l', and supplies the data relating to the display range f' to the focus optimizing circuit 31.

The focus optimizing circuit 31 determines whether or not the focus depths F2, F4, and F6 fall within the display range f', on the basis of the data relating to the display range f'. In FIG. 9C, the focus depth f'' is outside of the display range f'. Thus, the focus optimizing circuit 31 changes the focus depths to the focus depths F4, F5, and F6 located within the display range f'. The focus data corresponding to the changed focus depths F4, F5, and F6 is supplied to the transmitter control circuit 13 and receiver control circuit 14. Then, the operation carried out in the process illustrated in FIG. 9B is repeated, so that an image obtained at the focus depths F4, F5, and F6 is displayed on the monitor 28.

As described above, in the above embodiment, when the image is enlarged and shifted, the display range of the image on the monitor screen is recognized. If the initially set focus depths fall outside the recognized display range, the focus depths are changed, but the number of focus depths remains the same as the initially set depths. Thus, even if the image is enlarged or shifted, a desired number of focus depths can be automatically set, and an excellent diagnosis image can always be obtained. Namely, the image can be enlarged and shifted without paying attention to the focus positions, and the diagnosis efficiency can be enhanced.

The apparatus according to the embodiment shown in FIG. 5 is applicable to a two-stage focusing or a four-stage focusing technique, in addition to the three-stage focusing technique. The change of focus depths can be selectively executed only for the transmission or reception operation. Also, the change of focus depths is applicable to the downward shift or right-and-left shift combined with enlargement of the image, or to the downward shift or right-and-left shift without enlargement of the image.

In this embodiment, when the set focus depths fall outside the display range, the focus depths are changed within the display range by a factor corresponding to an area of the image which is excluded from the display range. However, it is possible to change the distance between the focus depths in order to change the focal positions to cover the excluded area.

Still another embodiment will now be described with reference to FIG. 10. The structural elements already mentioned above are indicated by the same reference numerals, and descriptions thereof are omitted.

Figure 11:
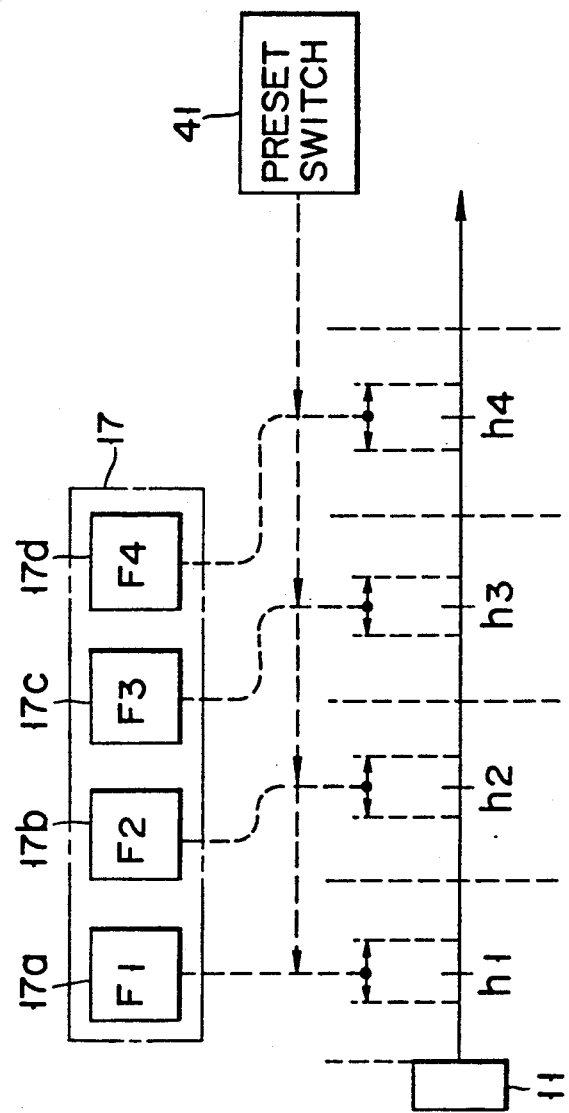
FIG. 11 is a view for explaining the relationship between a focus preset process and a focus condition preset process.

In the embodiment shown in FIG. 10, a preset switch 41 is provided for presetting focus conditions. The preset switch 41 is connected to a controller 40 including a CPU. The preset switch 41 stores, on an as-needed basis, the values of focus depths and the number of the focus depths set by the focus switch section 17 which can set four focus depths. In FIG. 11, when the focus switch 17b is turned on, a focus depth F2 corresponding to the switch 17b is stored by the controller 40. The controller 40 calculates, or reads out from an internal memory, data relating to degrees of delay suitable for converging ultrasonic beams at the focus depth F2. Upon the operation of the preset switch 41, the data on the degrees of delay is latched in the controller 40. Then, when the focus switch 17c is turned on, the focus depth F3 is set in the controller 40, and the controller 40 calculates or reads out data relating to degrees of delay corresponding to the focus depth F3. At this time, if the preset switch 41 is operated once again, the latter set focus depth F3 is cancelled, and the delay data corresponding to the previously set focus depth F2 latched in the controller 40 is output from the controller 40.

FIG. 12 shows the flow of the operation executed by the controller 40. When the operation of the apparatus is started, the controller 40 determines whether or not a focus depth has been set by the operation of the focus switch section 17 (S31). If the focus depth has been set, the controller 40 calculates, or reads out from the internal memory, data relating to the degree of delay necessary to converge ultrasonic beams at the focus depth, for example, F2 (S32). In the case where a plurality of focus depths have been set for a multi-focusing process, a plurality of data items corresponding to degrees of delay corresponding to the focus depths are calculated or read out.

In step S33, it is determined whether or not the reset switch 41 has been turned on. If the answer is NO in step 33, the obtained delay data is supplied to the transmitter control circuit 13 and receiver control circuit 14. If the reset switch 41 has been turned on, the calculated or readout delay data is latched in an internal buffer or the like (S35). Then, once again, it is determined whether or not the preset switch 41 has been turned on (S36). If the answer is NO in step 36, the control routine returns to step S31, and it is determined whether or not an updated focus depth has been set. If the updated focus depth F3 is set, the controller 40 calculates the delay data corresponding to the depth F3, and the calculated delay data is output to the transmitter control circuit 13 or receiver control circuit 14.

If the answer is YES in step S36, that is, if the preset switch 41 is turned on once again, the controller 40 ignores the updated depth F3, and delivers the latched delay data corresponding to depth F2 to the transmitter control circuit 13 and receiver control circuit 14.

As described above, by providing the preset switch, the updated focus condition is cancelled, and the former focus condition is set once again. Therefore, even if the the focus condition is changed because of the enlarging or shifting of the image, the former focus condition can be quickly used, and the review of the image can be easily carried out.

In the above embodiment, it is possible to provide a plurality of preset switches and to preset a plurality of focus conditions simultaneously.

What is claimed is:

1. An ultrasonic imaging apparatus comprising:
   ultrasonic transducer means for propagating ultrasonic beams toward a subject, and converting echo beams reflected from the subject into an echo signal;
   focus setting means for setting a plurality of focal depths;
   delay control means connected to said focus setting means, for outputting a plurality of delay signals corresponding to a plurality of the focal depths, said delay control means including means for detecting a central portion of a display range, means for changing the focal depths set by said focus setting means to a plurality of new focal depths corresponding to a plurality of locations within the display range and near the central portion of the display range, and means for outputting a new plurality of delay signals corresponding to the new focal depths;
   transmitter/receiver means connected to said ultrasonic transducer means and said delay control means, for driving said ultrasonic transducer means in accordance with the delay signals to scan the subject in a multi-focusing manner, and for processing the echo signal output from the ultrasonic transducer means; and
   display means connected to said transmitter/receiver means, for displaying a B-mode image based on the echo signal supplied from said transmitter/receiver means.

2. The apparatus according to claim 1, wherein said focus setting means has a plurality of switches corresponding to a predetermined number of preset focal depths for selecting a plurality of multi-focal points.

3. The apparatus according to claim 1, wherein said apparatus further comprises means for enlarging and shifting said B-mode image, and said delay control means comprises means for calculating a display range of an image on the basis of a scale factor and a shift amount of the image and for outputting display position data.

4. The apparatus according to claim 1, wherein said delay control means comprises means for calculating a degree of delay corresponding to said focal depths.

5. The apparatus according to claim 1, wherein said focus setting means includes focus continuous adjusting means for continuously adjusting said preset focus depths.

6. The apparatus according to claim 5, wherein said focus continuous adjusting means comprises an adjusting member which is continuously movable, and encoder means for outputting focus depth data in accordance with the amount of movement of the adjusting member.

7. The apparatus according to claim 6, wherein said encoder means comprises means for generating pulses in accordance with the amount of movement of said adjusting member and means for counting said pulses, and wherein said focus continuous adjusting means includes means for calculating a focus movement amount from the counted value of the pulses.

8. The apparatus according to claim 1, wherein said apparatus further comprises means for selectively storing data representing the preset focal depths set by said focus setting means.

9. The apparatus according to claim 1, wherein said focus setting means includes means for setting a plurality of of focal depths, and includes means for setting selectively a predetermined subset of said plurality of focal depths.

10. An ultrasonic imaging apparatus comprising:
    ultrasonic transducer means for propagating ultrasonic beams to a subject, and converting echo beams reflected from the subject into an echo signal;
    focus setting means for presetting a plurality of focus depths for performing multi-focusing;
    delay degree output means for determining whether or not the focus depths set by said preset means are located within a display range, wherein, when said delay degree output means determines that at least one of said focus depths is located out of the display range the delay degree output means selects at least one focus depth in the display range and outputting a delay degree corresponding to the focus depth within the display range;
    transmitter/receiver means for driving said ultrasonic transducer means in accordance with the delay degrees to scan the subject in a multi-focusing manner, and for processing the echo signal output from the ultrasonic transducer means; and
    display means for displaying a B-mode image based on the echo signal supplied from said transmitter/receiver means.

11. The apparatus according to claim 10, wherein said focus preset means has a plurality of preset switches selectively operated to obtain multi-focal points, said preset switches corresponding to a predetermined number of preset focus depths.

12. The apparatus according to claim 10, wherein said apparatus further comprises means for enlarging and shifting said B-mode image, and said delay degree output means comprises means for calculating a display range of an image on the basis of a scale factor and a shift amount of the image and for outputting display position data, and means for determining the delay degrees corresponding to focus depths corresponding to the center of a display screen in accordance with the display position data.

13. The apparatus according to claim 10, wherein said delay degree output means comprises means for calculating delay degrees from said focus depths.

14. The apparatus according to claim 10, wherein said focus setting means has a function capable of setting a large number of focus depth, and includes means for setting selectively a predetermined number of focus depths therewithin.

* * * * *

UNITED STATES PATENT AND TRADEMARK OFFICE
CERTIFICATE OF CORRECTION

PATENT NO. : 5,072,735

DATED : December 17, 1991

INVENTOR(S) : Takahisa Okazaki et al.

It is certified that error appears in the above-identified patent and that said Letters Patent is hereby corrected as shown below:

Title page, item [75], line 3, change "Nishinasundmachi" to --NISHINASUNOMACHI--.

Signed and Sealed this

Twenty-second Day of June, 1993

Attest:

MICHAEL K. KIRK

Attesting Officer

Acting Commissioner of Patents and Trademarks